United States Patent
Zou (10) Patent No.: US 8,315,520 B2
(45) Date of Patent: Nov. 20, 2012

(54) METHOD, SYSTEM AND APPARATUS FOR TRANSMITTING DATA

(75) Inventor: Shimin Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 857 days.

(21) Appl. No.: 12/394,959

(22) Filed: Feb. 27, 2009

(65) Prior Publication Data

US 2009/0226170 A1 Sep. 10, 2009

Related U.S. Application Data

(63) Continuation of application No. PCT/CN2007/002590, filed on Aug. 28, 2007.

(30) Foreign Application Priority Data

Sep. 1, 2006 (CN) .......................... 2006 1 0125866

(51) Int. Cl.
*H04J 14/00* (2006.01)
*H04B 10/20* (2006.01)

(52) U.S. Cl. .......................................... 398/67; 398/58
(58) Field of Classification Search .............. 398/58, 398/67

See application file for complete search history.

(56) References Cited

U.S. PATENT DOCUMENTS

| 5,719,872 | A | 2/1998 | Dubberly et al. | |
|---|---|---|---|---|
| 6,347,096 | B1 * | 2/2002 | Profumo et al. | 370/476 |
| 2003/0091045 | A1 * | 5/2003 | Choi et al. | 370/390 |
| 2003/0117998 | A1 * | 6/2003 | Sala et al. | 370/351 |

FOREIGN PATENT DOCUMENTS

| CN | 1417982 | | 5/2003 |
|---|---|---|---|
| CN | 1614944 | | 5/2005 |
| CN | 101442692 | A | 5/2009 |
| DE | 4233581 | A1 | 4/1994 |
| EP | 1311137 | A | 5/2003 |
| WO | WO-03007518 | | 1/2003 |

OTHER PUBLICATIONS

ITU-T Recommendation G.984.3, Gigabit-capable Passive Optical Networks (G-PON): Transmission convergence layer specification; International Telecommunication Union; Feb. 2004.*

Office Action in corresponding European Application No. 07800809.1 (May 4, 2011).

(Continued)

*Primary Examiner* — Nathan Curs (74) *Attorney, Agent, or Firm* — Leydig, Voit & Mayer, Ltd.

(57) ABSTRACT

The present invention provides a method and a system for transmitting data. The OLT sets a multiframe indication and an upstream timeslot indication overhead in the downstream frame sent to the ONU. After receiving the downstream frame, the ONU determines the upstream bandwidth position according to the multiframe indication and the upstream timeslot indication overhead, and sends upstream data to the OLT from the upstream bandwidth position of the upstream frame. Through controlling the upstream data transmission by multiframes, each T-CONT carries an overhead area regardless of the length, and thus able to carry longer payload as against an equivalent overhead area in the prior art. In this way, the overhead area is saved and the bandwidth utilization is improved.

4 Claims, 3 Drawing Sheets

OTHER PUBLICATIONS

"G984.3—Gigabit-capable Passive Optical Networks (G-PON): Transmission convergence layer specification," Series G: Transmission Systems and Media, Digital Systems and Networks—Digital sections and digital line system—Optical line systems for local and access networks, Feb. 2004, International Telecommunication Union, Geneva, Switzerland.

European Patent Office, Supplementary Search Report in European Patent Application No. 07800809.1 (Mar. 23, 2010).

European Patent Office, First Examination Report in European Patent Application No. 07800809.1 (Apr. 16, 2010).

State Intellectual Property Office of the People's Republic of China, Written Opinion of the International Searching Authority in International Patent Application No. PCT/CN2007/002590 (Dec. 6, 2007).

* cited by examiner

METHOD, SYSTEM AND APPARATUS FOR TRANSMITTING DATA

CROSS-REFERENCE TO RELATED APPLICATIONS

This application is a continuation of International Application No. PCT/CN2007/002590, filed on Aug. 28, 2007, which claims priority to Chinese Patent Application No. 200610125866.0, filed on Sep. 1, 2006, both of which are hereby incorporated by reference in their entireties.

FIELD OF THE INVENTION

The present invention relates to the data transmission technology, and in particular, to a method, a system and an apparatus for transmitting data in a Time Division Multiplexing (TDM)-based Passive Optical Network (PON) (TDM-PON).

BACKGROUND

Telecom networks include core networks, Metropolitan Area Networks (MANs) and access networks. A core network consists of core routers or switches and a backbone transmission network such as Synchronous Digital Hierarchy (SDH) network or Dense Wavelength Division Multiplexing (DWDM) network; an access network consists of various technologies such as Asymmetric Digital Subscriber Loop (ADSL) technology, Very High Bit Rate Digital Subscriber Loop (VDSL) technology, active point-to-point technology, PON technology and even wireless access technology.

With the emergence of new services, especially the development of high bandwidth video services such as Internet Protocol Television (IPTV) and High-Definition Television (HDTV), the access technology is challenged. The ADSL technology is economical but bandwidth-limited; the VDSL technology provides a bandwidth of over 50M but transmits a short distance. Besides, the ADSL technology and the VDSL technology are based on copper cables, thus vulnerable to interference. Moreover, with the copper resource becoming stringent, the development of the ADSL technology and the VDSL technology will be bottlenecked.

As a broadband optical access technology, the PON is characterized by a point-to-multipoint physical topology and consists of an Optical Line Terminal (OLT), a passive Optical Distribution Network (ODN) and multiple Optical Network Units (ONUs). Multiple ONUs share fiber resources and OLT ports; the ODN is connected to an OLT and one or more ONUs passively; the optical distribution point (ODP) in an ODN does not need any active node devices, but needs only a passive optical branching device (OBD). Therefore, the PON has these merits: shared bandwidth resources, economical investment on equipment rooms, high security of equipment, fast network construction and low overall cost of network construction.

A standardized PON includes: an Asynchronous Transfer Mode (ATM)-based PON (ATM-PON or APON), and a Broadband Passive Optical Network (BPON), both compliant with the International Telecommunications Union-Telecommunications (ITU-T) G983.x recommendations; an Ethernet PON (Ethernet-PON or EPON), compliant with the Institute of Electrical and Electronics Engineers (IEEE) 802.3ah recommendations; and a Gigabit-capable Passive Optical Network (GPON), compliant with the ITU-T G984.x recommendations. The PON technologies currently under research in the industry include: Wavelength Division Multiplexing (WDM)-based PON (WDM-PON), Optical Code Division Multiple Access (OCDMA)-based PON (OCDMA-PON), SubCarrier Multiplexed (SCM)-based PON (SCM-PON), etc.

With the growth of broadband services, the PON technologies are evolving. The process of evolution from APON/BPON to EPON and GPON is a process of increasing transmission bandwidth. Currently, the rate of the GPON is 2.5 Gbps for downstream and 2.5 Gbps, 1.5 Gbps or 622 Mbps for upstream. The frame structure of the GPON uses 125 µs (microsecond) as a period and uses the GFP as a link layer protocol, thus being suitable for transmitting not only Ethernet services data but also TDM services data. It is one of the ideal solutions for integrated services access.

In the current practice, the transmission mechanism for APON/BPON, GPON and EPON is Time Division Multiple Access (TDMA), namely, the downstream transmission is in the TDM mode and the upstream transmission is in the TDMA mode. In the TDMA mode, distance measurement (ranging) should be performed to control the time of sending upstream data from each ONU. However, the higher the PON rate is, the less accurate the ranging will be.

With the development of broadband services in the future, the optical access technologies will evolve to either of these possible destinations: The existing GPON or EPON evolve continuously to provide higher rates or combine with the WDM; or a wholly new technology such as WDM-PON replaces the existing technology. In view of the trend of the optical components, the system based on the WDM-PON technology is costly, and its room of development is rather limited before boom of the user quantity and brand services. Therefore, the TDM-PON evolving to high rates is much cost-effective and practical, and can inherit the existing GPON or EPON with respect to management and control, thus inheriting the technologies appropriately.

The GPON is a PON system promoted by the Full Service Access Network (FSAN) organization and formulated by the ITU-T standardization organization. The EPON challenging the BPON gives rise to the GPON. With respect to function and performance, the GPON is characterized by: providing multiple symmetric or asymmetric upstream and downstream rates flexibly, for example, upstream rate 1.244 Gbps, downstream rate 2.488 Gbps; the system distribution ratio is up to 1:16, 1:32, 1:64 or even 1:128, and is related to the Forward Error Correction (FEC) supported by GPON, while the EPON provides only symmetric 1.25 Gbps upstream and downstream rates, and provides a distribution ratio of up to 1:32; the GFP is suitable for adaptation of any data service; well supporting TDM service data transfer and providing assurance for timing performance; providing perfect Operation, Administration, Maintenance and Provisioning (OAM&P) capabilities.

Figure 1:
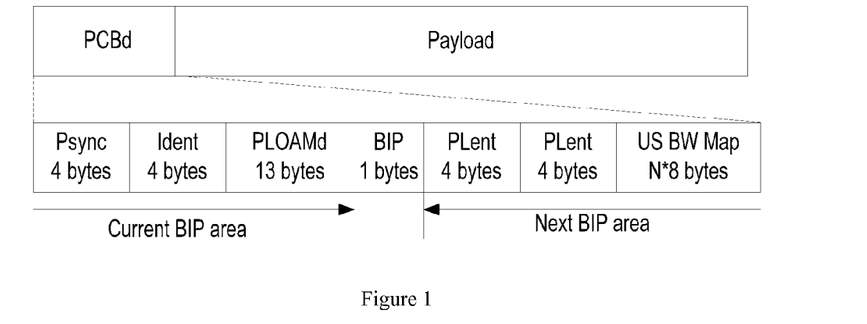
FIG. 1 a schematic diagram showing the structure of a PCBd overhead area in the GPON downstream frame.

The downstream frame of the GPON is a 125 µs frame structure. As shown in FIG. 1, a downstream frame in the GPON includes a Physical Control Block downstream (PCBd) overhead area and a payload area. The PCBd overhead area includes these fields: Physical Synchronization (PSync) field, superframe indication field, Physical Layer OAM downstream (PLOAMd) field, Bit Interleaved Parity (BIP) field, Payload Length downstream (PLend) field, and Upstream Bandwidth Map (US BW Map) field. The PSync field is used to implement synchronization between the ONU and the OLT; the PLOAMd field is used to bear the downstream Physical Layer OAM (PLOAM) information; the BIP field is used for error detection; the PLend field is used to indicate the length of the US BW Map field and the quantity of cells in the payload, wherein the PLend can occur twice in order to enhance the error tolerance; the US BW Map field is used to allocate upstream bandwidth, and includes an upstream timeslot indication overhead for indicating the start position and the end position of each ONU upstream timeslot. The control object of bandwidth allocation is Transmission Container (T-CONT). The OLT can allocate one or more T-CONTs to an ONU, which is a concept introduced into the PON Dynamic Bandwidth Allocation (DBA) technology to improve the efficiency of DBA.

Figure 2:
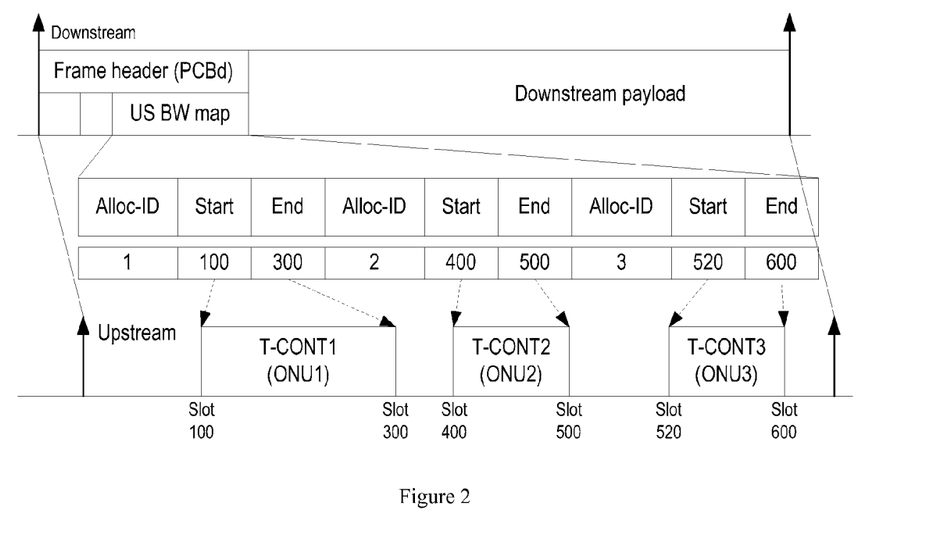
FIG. 2 is a schematic diagram illustrating allocation of GPON upstream timeslots.

The US BW Map field is used to indicate the start position and the end position of each ONU upstream timeslot; the T-CONT is the size of the timeslot allocated by the OLT to the ONU. The ONU sends an upstream burst packet to the OLT according to the position of the allocated timeslot. Taking ONU1 as an example, as shown in FIG. 2, through the US BW Map field in the downstream frame, the OLT notifies the ONU1 that the start position of the upstream timeslot is the 100th timeslot (TS100), and the end position is the 300th timeslot (TS300). In this way, the size of the T-CONT timeslots allocated by the OLT to the ONU1 is 200 timeslots. According to the timeslot position indicated by the received downstream frame, the ONU1 starts to send upstream burst packets to the OLT from TS100 of the upstream frame, and finishes sending the upstream burst packet at TS300.

Figure 3A:
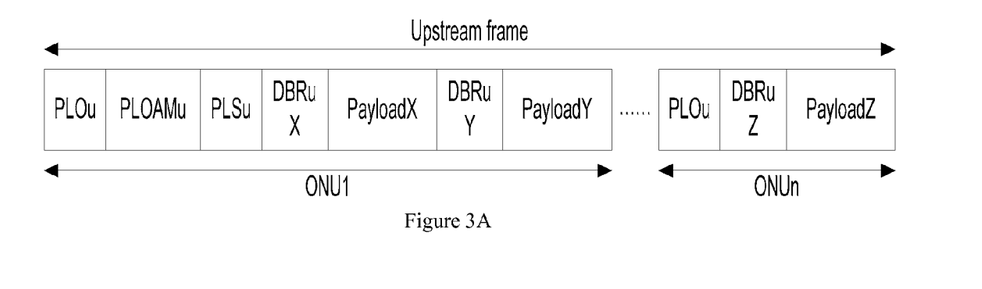
FIG. 3A is a schematic diagram showing the structure of a GPON upstream frame.
Figure 3B:
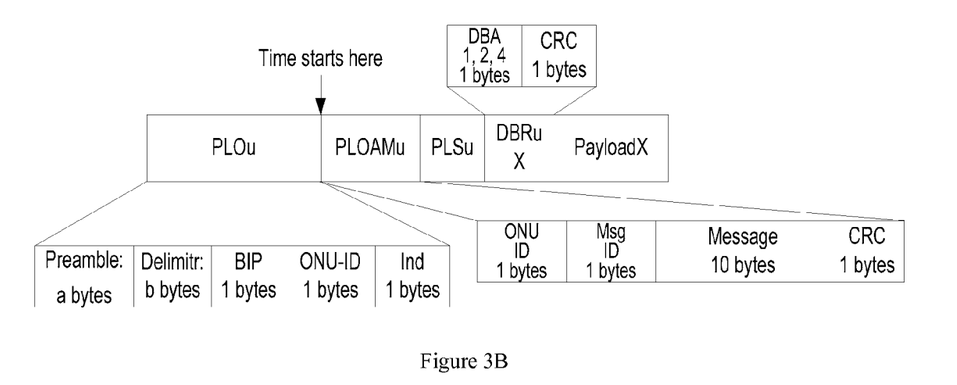
FIG. 3B is a schematic diagram showing the structure of an overhead area in the GPON upstream frame.

In the GPON, the period of both upstream frames and downstream frames is 125 μs. As shown in FIG. 3A and FIG. 3B, each ONU sends an upstream burst packet from the T-CONT allocated by the OLT to the OLT. Such an upstream burst packet includes an overhead area and a payload area. The overhead area includes these fields: Physical Layer Overhead (PLOu), Physical Layer OAM upstream (PLOAMu) field, Physical Layer Sequence upstream (PLSu) field for adjusting power, and Dynamic Bandwidth Report upstream (DBRu) field. The PLOu field is used to implement burst synchronization, and includes a preamble, a delimiter and a BIP. After occupying the upstream channel, the ONU sends a PLOu unit to the OLT so that the OLT can get synchronized with the ONU quickly, and receive valid upstream data from the ONU correctly. The PLOAMu field is used to bear the upstream PLOAM information, and includes an ONU identifier (ONU ID), a message identifier (message ID), a message and a Cyclic Redundancy Code (CRC).

As described above, in a TDM-based GPON, the period of both upstream frames and downstream frames is 125 μs regardless of the upstream rate. In this way, all ONUs must finish receiving and handling downstream frames within 125 μs, and must finish sending the upstream burst packets on the corresponding timeslot position of the T-CONT allocated by the OLT to the ONU within 125 μs.

Table 1 shows that the OLT and all ONUs must finish handling all signals within 125 μs, and the time for all ONUs to send upstream burst packets must meet the time overhead specified in Table 1. As shown in Table 1, the enabling time and the disabling time of the ONU are very short. Taking the upstream rate 2488.32 Mbps as an example, the enabling time and the disabling time of the ONU is 32/2488.32M=13 ns (nanosecond), which imposes a strict requirement on the upstream time overhead such as enabling time and the disabling time of the ONU transmitting unit, and the preamble time of the burst. This brings difficulty to processing of circuits and manufacturing of transmitting units, and increases the cost of transmitting units obviously. Moreover, the requirement on performance of the OLT receiver is very strict, and it is required that the OLT must implement correct clock recovery and frame delimitation within a very short time, which brings difficulty to manufacturing of the OLT and increases the manufacturing cost.

In addition, the upstream timeslot indication overhead in the GPON is only 16 bits. If the start position and the end position of the upstream timeslot in the upstream mapping bandwidth are only 16 bits, the maximum timeslot quantity indicated by the GPON will be $2^{16}$=65536, which is far from enough to meet the indication requirement of the upstream bandwidth position when the maximum timeslot quantity in the frame structure is greater than 65536 in the future.

In the final analysis, the data transmission mode in the TDM-PON in the prior art bottlenecks the development of the TDM-PON, and it is urgent to seek a data transmission solution that can boost the TDM-PON development.

SUMMARY

Accordingly, the present invention provides a method, a system and an apparatus for transmitting data to make the data transmission mode in the TDM-PON more conducive to the TDM-PON development through higher bandwidth utilization, extended physical-layer time overhead and so on. Further, a data transmission method provided in an embodiment of the present invention can extend upstream bandwidth position.

An embodiment of the present invention provides a data transmission method, including:

setting, by the OLT, a multiframe indication and an upstream timeslot indication overhead in the downstream frame sent to the ONU;

determining the upstream bandwidth position, by the ONU, according to the multiframe indication and the upstream timeslot indication overhead after receiving the downstream frame; and sending upstream data, by the ONU, to the OLT from the upstream bandwidth position of the upstream frame.

TABLE 1

Time overhead of the ONU in the burst mode

| Upstream rate (Mbps) | Enable time (bit) | Disable time (bit) | Total time (bit) | Protection time (bit) | Preamble time (bit) | Delimit time (bit) |
|---|---|---|---|---|---|---|
| 155.52 | 2 | 2 | 32 | 6 | 10 | 16 |
| 622.08 | 8 | 8 | 64 | 16 | 28 | 20 |
| 1244.16 | 16 | 16 | 96 | 32 | 44 | 20 |
| 2488.32 | 32 | 32 | 192 | 64 | 108 | 20 |
| Remarks | Maximum | Maximum | Mandatory | Minimum | Suggested | Suggested |

The multiframe indication is a multiframe count bit.

The multiframe count bit is part of the bits in the superframe counter in the downstream physical-layer control block, or a multiframe counter bit that is set separately.

If the multiframe count bit is part of the bits in the superframe counter in the downstream physical-layer control block, before the ONU receives the downstream frame, the method further includes: the OLT notifies the ONU of the multiframe indication bit, through the flag bit in the PLOAMd field or the US BW Map field.

If the multiframe count bit is part of the bits in the superframe counter in the downstream physical-layer control block, before the ONU receives the downstream frame after, the method further includes: the OLT notifies, through the PLOAMd message, the ONU to receive the downstream frame in the multiframe mode.

After the ONU receives the downstream frame, the method further includes: The local multiframe counter of the ONU performs multiframe synchronization according to the received multiframe indication bit.

The upstream timeslot indication overhead is located in the downstream physical-layer control block overhead area.

Before the OLT sets a multiframe indication and an upstream timeslot indication overhead in the downstream frame sent to the ONU, the method further includes: The OLT allocates upstream bandwidth position of upstream data to each ONU according to the time length of the upstream frame, and then determines the upstream timeslot indication overhead included in each downstream frame according to the upstream bandwidth position.

The setting, by the OLT, a multiframe indication and an upstream timeslot indication overhead in the downstream frame sent to the ONU, further includes: The OLT notifies the ONU of the bit quantity required by the upstream bandwidth position. Before the upstream bandwidth position is determined, the method further includes: The ONU retrieves the quantity of bits from the upstream time indication overhead of the highest bit and the lowest bit in the upstream bandwidth position consecutively according to the quantity of bits required by the upstream bandwidth position.

The setting the upstream timeslot indication overhead includes: setting the upstream timeslot indication overhead into different downstream frames according to the multiframe indication, where the upstream timeslot indication overhead in different downstream frames is used to make up an upstream bandwidth position specific to highest bits and lowest bits. The indication range of the upstream bandwidth position is greater than the maximum timeslot quantity of an upstream frame. The determining the upstream bandwidth position according to the multiframe indication and the upstream timeslot indication overhead includes: according to the multiframe indication, retrieving the upstream timeslot indication overhead in different downstream frames to make up an upstream bandwidth position specific to highest bits and lowest bits.

Supposing that the upstream timeslot indication overhead in each downstream frame contains m bits, and that the upstream bandwidth position retrieves m bits from each upstream timeslot indication overhead. If the upstream timeslot indication overhead that makes up the upstream bandwidth position is set to be located in L downstream frames, the range indicated by the upstream bandwidth position is 0 to $2^{m*L}$. If the upstream timeslot indication overhead that makes up the upstream bandwidth position is set to be located in L downstream frames and the upstream bandwidth position retrieves N bits in the upstream timeslot indication overhead, the range indicated by the upstream bandwidth position is 0 to $2^N$, in which m, L and N are positive integers.

The determining, by the ONU, the upstream bandwidth position according to the multiframe indication and the upstream timeslot indication overhead after receiving the downstream frame, is specifically: The ONU receives the upstream timeslot indication overhead in different downstream frames, and, according to the multiframe indication, determines how the bit of the upstream timeslot indication overhead in the downstream frame of the multiframe indication is located in the upstream bandwidth position, and then determines the upstream bandwidth position.

The upstream bandwidth position includes: the start position of the upstream timeslot, and the end position of the upstream timeslot.

Before the ONU sends upstream data to the OLT from the upstream bandwidth position of the upstream frame, the method further includes: The ONU generates an upstream burst frame according to the upstream bandwidth position, where the upstream burst frame includes an upstream overhead area and a payload area; the ONU sets a physical-layer time overhead, which includes at least a preamble time or a frame delimiting time; and the ONU enables the laser before sending the upstream burst frame. After the ONU sends upstream data, by the ONU, to the OLT from the upstream bandwidth position of the upstream frame, the method further includes: The ONU disables the laser after finishing data sending.

A downstream multiframe consists of at least two downstream frames.

The time length of the upstream frame is the same as that of the downstream multiframe.

When the upstream bandwidth of the ONU is constant, the time length represented by the upstream bandwidth position is in proportion to the time length of the upstream frame; or, when the upstream bandwidth efficiency of the ONU is constant, the physical-layer time overhead length for the ONU to handle upstream data is in proportion to the length of the upstream frame.

The physical-layer time overhead is the enabling time overhead of the burst sending laser of the ONU, or the protection time overhead between upstream burst packets, or the preamble time overhead.

An embodiment of the present invention provides a data transmission system, including:

an OLT, adapted to make up a downstream frame structure, set a multiframe indication and an upstream timeslot indication overhead in the downstream frame, send the downstream frame to the ONU, and receive the upstream data from the ONU; and an ONU, adapted to receive downstream frames, determine the upstream bandwidth position according to the multiframe indication and the upstream timeslot indication overhead, and send upstream data to the OLT from the upstream bandwidth position of the upstream frame.

The OLT is further adapted to allocate, according to the time length of the upstream frame, to the ONU an upstream bandwidth position for sending upstream data, and determine, according to the upstream bandwidth position, the upstream timeslot indication overhead included in each downstream frame in the downstream multiframe.

The OLT includes:

a transmission convergence unit, adapted to make up a downstream frame structure, set a multiframe indication and an upstream indication overhead in the downstream frame, and handle the upstream data from the ONU; and an interface unit, which includes an upstream burst optical receiver and a downstream optical transmitter and is adapted to convert the frame signals from the transmission convergence unit into optical signals and send them to the ONU, receive the upstream data from the ONU and send them to the transmission convergence unit for processing.

The transmission convergence unit is further adapted to allocate, according to the time length of the upstream frame, to the ONU an upstream bandwidth position for sending upstream data, and determine, according to the upstream bandwidth position, the upstream timeslot indication overhead included in each downstream frame in the downstream multiframe.

The ONU includes:

a transmission convergence unit, adapted to retrieve the upstream timeslot indication overhead from different downstream frames, determine an upstream bandwidth position jointly specific to highest bits and lowest bits, generate an upstream burst frame according to the upstream bandwidth position, where the upstream burst frame includes an upstream overhead area and a payload area, set a physical-layer time overhead, which includes at least setting of a preamble time or a frame delimiting time, and send an upstream burst frame to the interface unit;

an interface unit, which includes an optical transmitter for transmitting burst data and an optical receiver for receiving downstream optical signals, and is adapted to enable the laser before sending burst data according to the set laser enable time overhead, and disable the laser after finishing burst data sending.

When the upstream bandwidth of the ONU is constant, the time length represented by the upstream bandwidth position is in proportion to the time length of the upstream frame; or, when the upstream bandwidth efficiency of the ONU is constant, the physical-layer time overhead length for the ONU to handle upstream data frames is in proportion to the length of the upstream frame.

The physical-layer time overhead is the enabling time overhead of the burst sending laser of the ONU, or the protection time overhead between upstream burst packets, or the preamble time overhead.

An embodiment of the present invention provides a data transmission apparatus, located in the OLT and including:

a transmission convergence unit, adapted to make up a downstream frame structure, and set a multiframe indication and an upstream timeslot indication overhead in the downstream frame; and an interface unit, adapted to send downstream frames and receive data.

The transmission convergence unit is further adapted to: allocate, according to the time length of the upstream frame, to the ONU an upstream bandwidth position for sending upstream data, and determine, according to the upstream bandwidth position, the upstream timeslot indication overhead included in each downstream frame in the downstream multiframe.

An embodiment of the present invention provides a data transmission apparatus, located in the ONU and including:

an interface unit, adapted to receive downstream frames, and send upstream data from the upstream bandwidth position of the upstream frame; and a transmission convergence unit, adapted to determine the upstream bandwidth position according to the multiframe indication and the upstream timeslot indication overhead.

When the upstream bandwidth of the ONU is constant, the time length represented by the upstream bandwidth position is in proportion to the time length of the upstream frame; or, when the upstream bandwidth efficiency of the ONU is constant, the physical-layer time overhead length for the ONU to handle upstream data frames is in proportion to the length of the upstream frame.

The physical-layer time overhead is the enabling time overhead of the burst sending laser of the ONU1, or the protection time overhead between upstream burst packets, or the preamble time overhead.

In the present invention, the OLT sets a multiframe indication and an upstream timeslot indication overhead in the downstream frame sent to the ONU. After receiving the downstream frame, the ONU determines the upstream bandwidth position according to the multiframe indication and the upstream timeslot indication overhead, and sends upstream data to the OLT from the upstream bandwidth position of the upstream frame. Through controlling the upstream data transmission by multiframes in the present invention, each T-CONT carries an overhead area regardless of the length, and thus is able to carry longer payload compared with an equivalent overhead area in the prior art. In this way, the overhead area is saved and the bandwidth utilization is improved. Moreover, with the same bandwidth utilization as in the prior art, the present invention can extend the physical-layer time overhead, thus leaving more time for the ONU and the OLT to handle upstream data, reducing the production cost of the ONU and the OLT, and enhancing the reliability of the OLT in receiving upstream data.

DETAILED DESCRIPTION

Figure 4:
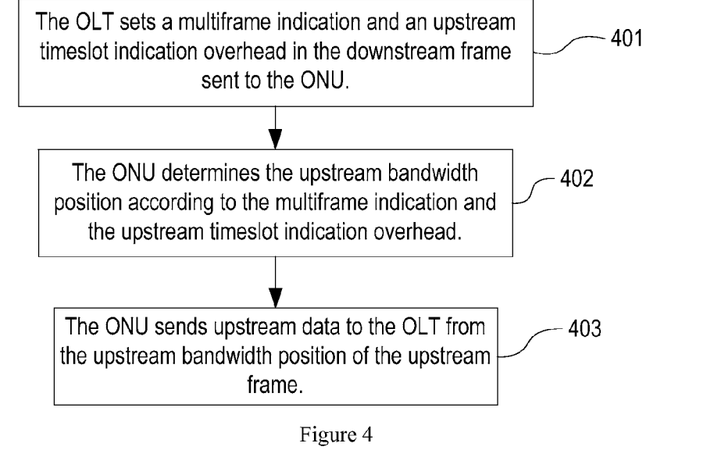
FIG. 4 is a flowchart of data transmission according to an embodiment of the present invention.

FIG. 4 is a flowchart of data transmission according to an embodiment of the present invention. As shown in FIG. 4, a procedure of data transmission includes the following steps:

In Step 401, the OLT sets a multiframe indication and an upstream timeslot indication overhead in the downstream frame sent to the ONU. The multiframe indication is adapted to indicate the quantity of downstream frames included in the ONU downstream multiframe, and the position of the bits of the upstream timeslot indication overhead in the upstream bandwidth position (the position of bits is included in the downstream frame of the multiframe indication). The quantity of downstream frames included in the downstream multiframe can be determined according to the bit quantity indicated by the multiframe. For example, if the multiframe indication is 01, since the multiframe indication contains two bits, it means that the downstream multiframe contains $2^2=4$ downstream frames. Namely, the time length of the downstream multiframe is the time length of four downstream frames. 01 means that the upstream timeslot indication overhead contained in the downstream frame of the multiframe indication 01 is located at the highest bit of the upstream bandwidth position.

Before Step 401, the OLT allocates to each ONU an upstream bandwidth position for sending upstream data according to the time length of the upstream frame, and then determines the upstream timeslot indication overhead included in each downstream frame in the downstream multiframe according to the upstream bandwidth position. When setting the upstream timeslot indication overhead, the OLT sets an upstream timeslot indication overhead into different downstream frames according to the multiframe indication. The time length of an upstream frame is greater than the length of a downstream frame, and may be identical to or different from the time length of the downstream multiframe. The time length of an upstream frame, namely, the period of an upstream frame, may be set according to the actual conditions.

In Step 402, after receiving the downstream frame, the ONU determines the upstream bandwidth position according to the multiframe indication and the upstream timeslot indication overhead.

For example, if the OLT sets a multiframe indication "000" in the first downstream frame sent to the ONU, it indicates that the upstream timeslot indication overhead included in the downstream frame is located at the lowest bit of the upstream bandwidth position. If the OLT sets a multiframe indication "001" in the second downstream frame sent to the ONU, it indicates that the upstream timeslot indication overhead included in the downstream frame is located in the lowest but one position of the upstream bandwidth position. If the OLT sets a multiframe indication "010" in the second downstream frame sent to the ONU, it indicates that the upstream timeslot indication overhead included in the downstream frame is located at the highest bit of the upstream bandwidth position. After receiving eight downstream frames in the multiframe, the ONU puts the upstream timeslot indication overhead in the first downstream frame to the lowest bit of the upstream bandwidth position, puts the upstream timeslot indication overhead in the second downstream frame to the lowest but one position of the upstream bandwidth position, and puts the upstream timeslot indication overhead in the third downstream frame to the highest bit of the upstream bandwidth position, and the multiframe indication in the subsequent five downstream frames indicates that the bits are reserved. In this way, the upstream timeslot indication overheads in the three downstream frames make up an upstream bandwidth position jointly.

Further, the OLT may notify the ONU of the quantity of bits required for the upstream bandwidth position. In this way, after determining the bit position of the upstream timeslot indication overhead in the upstream bandwidth position according to the multiframe indication, the ONU may retrieve the corresponding quantity of bits from the upstream timeslot indication overhead in the highest few bit positions of the upstream bandwidth position according to the bit quantity required by the upstream bandwidth position.

For example, the OLT further notifies the ONU that 24 bits are required by the upstream bandwidth position, and, in the first downstream frame sent to the ONU, the OLT sets a multiframe indication "00", which means that the upstream timeslot indication overhead in the downstream frame is located in the lowest 16 bits of the upstream bandwidth position. If the OLT sets a multiframe indication "01" in the second downstream frame sent to the ONU, it means that the upstream timeslot indication overhead in the downstream frame is located in the highest eight bits of the upstream bandwidth position. After receiving the four downstream frames in the downstream multiframe, the ONU puts the 16-bit upstream timeslot indication overhead in the first downstream frame to the lowest 16 bits of the upstream bandwidth position, retrieves the eight significant bits of the 16-bit upstream timeslot indication overhead included in the second downstream frame, and puts them to the highest eight bits of the upstream bandwidth position. In this way, the 24 bits of upstream timeslot indication overhead make up an upstream bandwidth position jointly.

In Step 403, the ONU sends upstream data to the OLT from the upstream bandwidth position of the upstream frame. In an upstream frame, the ONU can send upstream data to the OLT once or repeatedly. As for whether the ONU sends upstream data to the OLT once or repeatedly, it depends on the quantity of upstream bandwidth positions allocated by the OLT to each ONU. If the OLT allocates one upstream bandwidth position to one ONU, the ONU sends upstream data to the OLT only once on the corresponding upstream bandwidth position; if the OLT allocates multiple upstream bandwidth positions to one ONU, the ONU sends upstream data to the OLT on every upstream bandwidth position separately, namely, sends upstream data to the OLT repeatedly.

The upstream bandwidth position mentioned above includes: the start position of the upstream timeslot, and the end position of the upstream timeslot. Specifically, an upstream bandwidth position may be a timeslot position of the upstream transmission container, including the start position of the timeslot and the end position of the timeslot of the upstream transmission container.

The period of the downstream multiframe is an integer multiple of the downstream frame period, where the integer may be $2^n$.

The process mentioned above is elaborated below, taking GPON as an example. In a GPON, the set downstream rate and upstream rate are both 2.5 Gbps, and the downstream frame period is 125 μs. The OLT uses the lowest two bits in the superframe counter as a multiframe indication. In this way, the multiframe indication indicates that one downstream multiframe contains four downstream frames. The time length of a downstream multiframe is 500 μs. The OLT may set the length of the upstream frame to be the same as the length of downstream multiframe, namely, the time length of the upstream frame is 500 μs.

According to the length of an upstream frame, the OLT determines the upstream bandwidth position of each ONU1, namely, the timeslot position of the T-CONT of the upstream burst packet sent from the ONU to the OLT. In the time length of an upstream frame, if the OLT allocates only one T-CONT to each ONU, the frequency of repetition of T-CONTs of an ONU is 1/500 μs=2 Kbps.

The superframe counter of the Ident field in the PCBd contains 30 bits, which provides very wide count range. Therefore, the OLT may use some bits in the superframe counter as a multiframe indication, for example, use the lowest few bits of the superframe counter as a multiframe indication. If the OLT uses two bits in the superframe counter as a multiframe indication, it indicates that the time length of the downstream multiframe is the time length of four downstream frames. If the OLT uses three bits in the superframe counter as a multiframe indication, it indicates that the time length of the downstream multiframe is the time length of eight downstream frames. To prevent confusing with other functions of the superframe counter, the OLT does not use some bits in the superframe counter as multiframe indication, but sets a dedicated multiframe counter for multiframe indication.

The upstream timeslot indication overhead indicated by the UP BW Map field is used to indicate the timeslot position of the T-CONT. The range indicated by the upstream timeslot indication overhead should be greater than or equal to the maximum timeslot quantity of an upstream frame. However, when the time length of the upstream frame is greater than the time length of the existing upstream frame, the upstream bandwidth position determined through the existing upstream timeslot indication overhead is far from enough to meet the requirement. Therefore, it is necessary to extend the upstream bandwidth position by using the downstream multiframe. Namely, the upstream timeslot indication overhead contained in a downstream frame is used as only part of the bits of the upstream bandwidth position in the upstream burst packet sent from the ONU to the OLT. The upstream timeslot indication overheads of multiple downstream frames combine into an upstream bandwidth position. In this way, multiframe indication tells the ONU how the bits of the upstream timeslot indication overhead contained in the downstream frame are located in the upstream bandwidth position.

Through a separate PLOAMd message, the OLT notifies the ONU to receive the downstream frames in the multiframe mode. Through the flag bit in the PLOAMd field or the US BW Map field, the OLT may notify the bits of the multiframe indication to the ONU, namely, the size of the multiframe counter, for example, using the lowest three or two bits in the superframe counter as a multiframe indication. An example is given below. Through the flag bit in the PLOAMd field or the US BW Map field, if the OLT notifies the ONU that the lowest two bits make up the multiframe indication, the ONU will use the lowest two bits in the superframe counter as multiframe synchronization signals, and the local multiframe counter of the ONU will perform multiframe synchronization. If the OLT sets a separate multiframe counter specific to multiframe indication, the ONU will use the multiframe counter as multiframe synchronization signals, and the local multiframe counter of the ONU will perform multiframe synchronization.

According to the time length of the upstream frame, the OLT allocates a timeslot position of T-CONT to each ONU, namely, sends the start position and end position of the upstream timeslot of the upstream burst packet to each ONU. Afterward, according to the timeslot position of the T-CONT, the OLT determines the upstream timeslot indication overhead contained in the US BW Map field of the downstream frame. For example, if the timeslot position of the T-CONT is 20 bits, the OLT will fill the lowest 16 bits into the upstream timeslot indication overhead of the first downstream frame, and set a multiframe indication "00" in the downstream frame, which means that the upstream timeslot indication overhead contained in the downstream frame is located at the lowest 16 bits of the T-CONT timeslot position. Afterward, the OLT fills the remaining four bits into the upstream timeslot indication overhead of the second downstream frame, and sets the multiframe indication "01" in the downstream frame, which means that the upstream timeslot indication overhead contained in the downstream frame is located at the highest four bits of the T-CONT timeslot position. Through a separate PLOAMd message, the OLT may notify the bit quantity required by the upstream bandwidth position to the ONU; through the flag bit in the PLOAMd field or the US BW Map field, the OLT may notify the bit quantity required by the upstream bandwidth position to the ONU.

Figure 5:
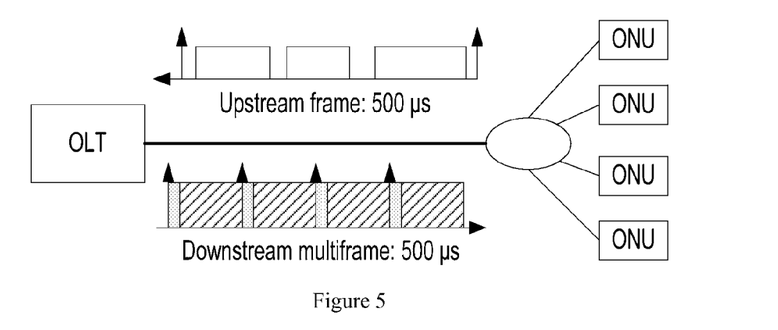
FIG. 5 is a schematic diagram illustrating data transmission according to an embodiment of the present invention.

After receiving the downstream frames in the downstream multiframe and finishing multiframe synchronization, according to the multiframe indication in each downstream frame, the ONU puts the upstream timeslot indication overhead of the downstream frame containing the multiframe indication into the corresponding bit position of the T-CONT timeslot position, thus obtaining the T-CONT timeslot position. For example, according to the multiframe indication "00", the ONU puts the upstream timeslot indication overhead in the downstream frame containing the multiframe indication "00" into the lowest 16 bits of the T-CONT timeslot position; according to the multiframe indication "01", the ONU puts the upstream timeslot indication overhead in the downstream frame containing the multiframe indication "01" into the highest four bits of the T-CONT timeslot position, thus obtaining the T-CONT timeslot position. Afterward, the ONU sends an upstream burst packet to the OLT on the T-CONT timeslot position of the upstream frame. The details of the foregoing process are illustrated in FIG. 5.

Figure 6:
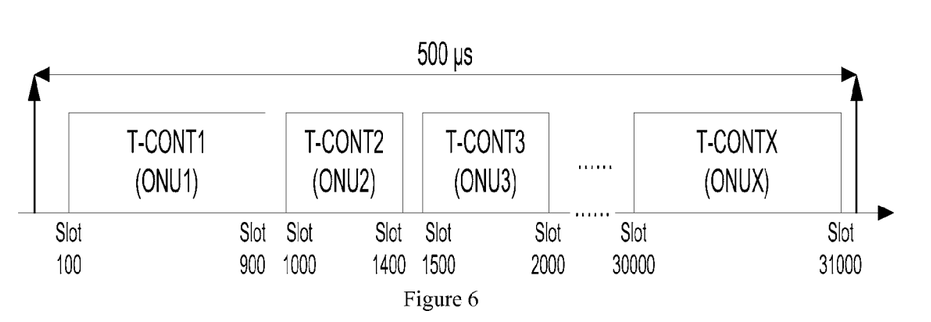
FIG. 6 is a schematic diagram illustrating timeslot allocation of upstream frames according to an embodiment of the present invention.

The following illustration takes a scenario of timeslot assignment according to a time length of a 500 µs upstream frame as an example. As shown in FIG. 6, compared with the prior art, in the case of allocating equal bandwidth to every ONU for the same quantity of ONUs and OLTs, each ONU can obtain a longer T-CONT than the time of GPON in the prior art. Taking ONU1 as an example, the ONU1 can obtain a T-CONT1 of only 200 timeslots in the prior art, but can obtain a T-CONT1 of 800 timeslots in an embodiment of the present invention. That is because the upstream frame length is quadruplicated.

Figure 7:
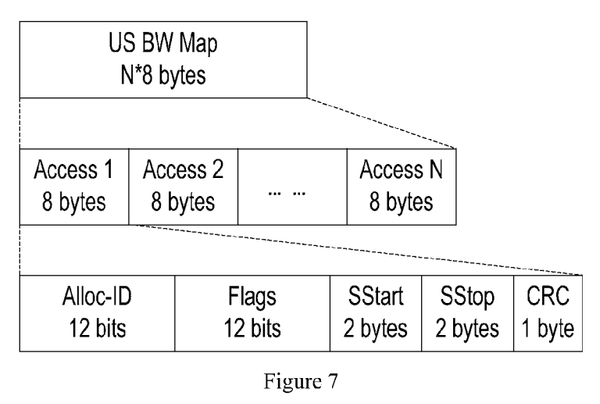
FIG. 7 shows the structure of a T-CONT indication in the prior art.

The T-CONT timeslot position allocated by the OLT to each ONU should be indicated through a specific upstream timeslot indication. As shown in FIG. 7, the structure of a GPON downstream frame in the prior art uses the SStart and the SStop to tell each ONU about the start position and the end position of the T-CONT on the upstream timeslot respectively. Therefore, the processing mode put forward herein is compatible with the prior art. Namely, the present invention reserves the indication structure of the GPON downstream frame in the prior art, and extends the indication in the case of a downstream multiframe. For example, when the upstream rate is 2.5 Gbps, the maximum timeslot quantity in an upstream frame within 125 µs is 38880 bytes or timeslots. The maximum timeslot quantity in an upstream frame within 500 µs is 38880×4=155520. Obviously, the maximum timeslot quantity goes beyond the range indicated by the 16-bit SStart and SStop, namely, $2^{16}$=65536. In the present invention, a multiframe indication is used to extend the upstream bandwidth position, so that the indication range of the upstream bandwidth position is increased greatly. For example, if the 16-bit SStart in the downstream frame with the multiframe indication "00" and the 16-bit SStart in the downstream frame with the multiframe indication "01" are used together to indicate the start position of the T-CONT on the upstream timeslot, the 32-bit indication range is fully enough to indicate the maximum timeslot quantity after the time length of the upstream frame is increased, as shown in Table 2.

TABLE 2

Extended T-CONT range for multiframe indication

| Multiframe indication (lowest 2 bits of superframe counter) | SStart | SStop | Application |
|---|---|---|---|
| 00 | Lowest 16 bits | Lowest 16 bits | 2.5 Gbps single-frame indication |

TABLE 2-continued

Extended T-CONT range for multiframe indication

| Multiframe indication (lowest 2 bits of super-frame counter) | SStart | SStop | Application |
|---|---|---|---|
| 01 | Highest 16 bits | Highest 16 bits | Performs 2.5 Gbps multiframe indication or performs single-frame or multiframe indication of higher than 2.5 Gbps in light of the lowest 16 bits. |
| 10 | Reserved | Reserved | |
| 11 | Reserved | Reserved | |

Supposing that the upstream timeslot indication overhead in each downstream frame contains m bits, and that the upstream bandwidth position retrieves m bits from each upstream timeslot indication overhead, if the upstream timeslot indication overhead that makes up the upstream bandwidth position is set to be located in one downstream frame, the range indicated by the upstream bandwidth position is 0 to $2^m$. If the upstream timeslot indication overhead that makes up the upstream bandwidth position is set to be located in two downstream frames, the range indicated by the upstream bandwidth position is 0 to $2^{2*m}$, and so on. If the upstream timeslot indication overhead that makes up the upstream bandwidth position is set to be located in L downstream frames, the range indicated by the upstream bandwidth position is 0 to $2^{m*L}$. Further, if the upstream timeslot indication overhead that makes up the upstream bandwidth position is set to be located in L downstream frames and the upstream bandwidth position retrieves N bits in the upstream timeslot overhead, the range indicated by the upstream bandwidth position is 0 to $2^N$, in which m, L and N are positive integers.

After enough T-CONT is allocated to every ONU, it means that the time for the ONU to handle upstream burst packets is more than that available in the prior art. For example, in the prior art shown in FIG. 2, the ONU1 of the GPON must send an upstream burst packet whose length is 200 timeslots/bytes within every 125 μs, with the rate of each timeslot being 64 Kbps. The upstream burst packet represents a bandwidth of approximately 200×64 Kbps=12.8 Mbps. When the length of the upstream frame under the present invention is 4 times as much as the existing upstream frame length, namely, the time length of the upstream frame is 500 μs, and the ONU1 sends upstream burst packets still through the bandwidth 12.8 Mbps, the T-CONT1 length under the present invention is four times as much as the T-CONT1 length in the existing GPON, namely, 800 timeslots or bytes. In the prior art, each upstream packet must carry a fixed overhead area. As shown FIG. 3B, for sending a 12.8 M payload, the data transmission method under the present invention consumes less overhead areas obviously. Each upstream burst packet of the ONU needs the same quantity of overhead areas regardless of the length. Therefore, compared with the prior art, the present invention provides a longer payload area, supposing that the overhead area is the same. The quantity of overhead areas required for the prior art can be used for transmitting 800 bytes under the present invention. Therefore, the present invention controls the transmission of upstream burst packets through a multiframe indication, thus improving the bandwidth utilization greatly.

As shown in Table 1, when the upstream rate is 2.5 Gbps, a 192-bit time overhead is required. Namely, a 24-byte time overhead is required for transmitting a 200-byte T-CONT1. Conversely, if the bandwidth utilization ratio is the same as that in the data transmission under the prior art, more time is available for extending the time overhead. This can lower the requirement on the time of processing upstream burst packets imposed by the ONU, and improve the reliability of the OLT in receiving upstream burst packets.

For example, 192-bit time overhead is required for the GPON under the prior art when the upstream rate is 2.5 Gbps. Among the time overhead, the time for enabling the ONU transmitting laser is 32 bits, namely, 13 ns, and the time for disabling the ONU transmitting laser is also 32 bits. If the data transmission mode changes to the multiframe mode, for keeping the bandwidth utilization ratio available from the prior art, the T-CONT length of the ONU will be longer than that in the prior art. Therefore, more time is available for the ONU and the OLT to process upstream burst packets, and the time overhead is four times as much as that of the prior art. Namely, if 24 bytes are required as time overhead for transmitting 200 bytes in the prior art, 96 bytes are required as time overhead for transmitting 800 bytes under the present invention. In other words, because multiframe is used to control upstream data transmission, the physical-layer time overhead increases greatly, without reducing the bandwidth utilization ratio. In theory, the time overhead can be increased to L times, where L is the quantity of existing upstream frames contained in the time length of an upstream frame under the present invention. If the prior art requires 13 ns to enable the laser, the present invention can provide a time greater than 13 ns, for example, 52 ns. In this way, the manufacturing of ONU transmitting lasers becomes easier. Moreover, the preamble time can increase by the same multiple to provide more sufficient clock recovery time of the OLT. Besides, when the OLT receives an upstream burst packet, the clock recovery time increases due to increase of the preamble time. This reduces the clock recovery requirement on the OLT receiver, reduces the cost of the OLT receiver, and improves the receiving reliability.

In the final analysis, by using multiframe to control data transmission, the present invention provides these merits: (1) Since each T-CONT carries an overhead area regardless of the length, the present invention is able to carry longer payload compared with an equivalent overhead area in the prior art. In this way, the overhead area is saved and the bandwidth utilization is improved; (2) with the same bandwidth utilization as in the prior art, the present invention can extend the physical-layer time overhead, namely, with the upstream bandwidth efficiency of the ONU being constant, the physical-layer time overhead length for the ONU to handle upstream data is in proportion to the upstream frame length, thus leaving more time for the ONU and the OLT to handle upstream data, reducing the production cost of the ONU and the OLT, and enhancing the reliability of the OLT in receiving upstream data. The physical-layer time overhead is the enabling time overhead of the burst sending laser of the ONU, or the protection time overhead between upstream burst packets, or the preamble time overhead.

By using multiframe indication to extend the upstream bandwidth position, the present invention frees the way of expressing the upstream bandwidth position from being limited by the bit quantity that can be indicated by the upstream timeslot indication overhead. When the upstream rate of the GPON increases from 2.5 Gbps to 10 Gbps, an upstream frame with the time length of 125 μs contains 270*9*64=155520 bytes. If one byte constitutes a timeslot, there are 155520 timeslots, which are far beyond the 16-bit indication range of the SStart and SStop in the GPON under the prior art. This problem is solved naturally by the method provided in the present invention. As shown in Table 2, the 16-bit SStart in the downstream frame with the multiframe indication "00" is used together with the 16-bit SStart in the downstream frame with the multiframe indication "01" to represent the upstream bandwidth position, thus making the indication range of the upstream bandwidth position exceed 216 largely. If the multiframe indication is set to three bits, a total of 24 bits can be used to indicate the upstream bandwidth position, thus being able to fulfill the applications that require an upstream rate of 10 Gbps to 40 Gbps. Such combined indication can indicate both single-frame transmission and multiframe transmission. In particular, when a multiframe is used to control upstream data transmission of high-speed TDM-PON, it is essential to reduce the overhead time. The time spared by multiframe-based data transmission is used to extend the physical-layer time overhead of the 10 Gbps upstream burst packet, for example, to increase the enable time range and the disable time range, or increase the preamble time of the upstream burst packet. This can reduce the requirement of manufacturing transmitting units in the case of an upstream rate of 10 Gbps and cut down the production cost.

Figure 8:
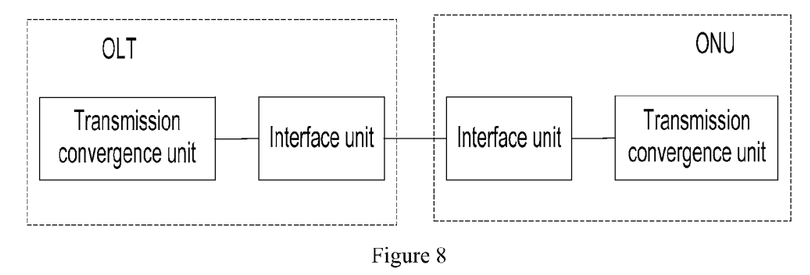
FIG. 8 shows the structure of a data transmission system according to an embodiment of the present invention.

FIG. 8 shows the structure of a data transmission system provided in an embodiment of the present invention. As shown in FIG. 8, a data transmission system includes:

an OLT, adapted to make up a downstream frame structure, set a multiframe indication and an upstream timeslot indication overhead in the downstream frame, send the downstream frame to the ONU, and receive the upstream data from the ONU; and an ONU, adapted to receive downstream frames, determine the upstream bandwidth position according to the multiframe indication and the upstream timeslot indication overhead, and send upstream data to the OLT from the upstream bandwidth position of the upstream frame. The OLT can communicate with the ONU through an ODN.

The OLT is further adapted to determine bit quantity required by the upstream bandwidth position, and send to the ONU the bit quantity required for the upstream bandwidth position. Further, the OLT is adapted to allocate to each ONU an upstream bandwidth position for sending upstream data according to the time length of the upstream frame, and then determine the upstream timeslot indication overhead included in each downstream frame in the downstream multiframe according to the upstream bandwidth position.

An OLT includes: a transmission convergence unit, adapted to make up a downstream frame structure, set a multiframe indication and an upstream indication overhead in the downstream frame, and handle the upstream data from the ONU; and an interface unit, which includes an upstream burst optical receiver and a downstream optical transmitter and is adapted to convert the frame signals from the transmission convergence unit into optical signals and send them to the ONU, receive the upstream data from the ONU and send them to the transmission convergence unit for processing. Further, the transmission convergence unit is adapted to determine bit quantity required for the upstream bandwidth position, and the interface unit is adapted to send to the ONU the bit quantity required for the upstream bandwidth position. Furthermore, the transmission convergence unit is adapted to allocate to each ONU an upstream bandwidth position for sending upstream data according to the time length of the upstream frame, and then determine the upstream timeslot indication overhead included in each downstream frame in the downstream multiframe according to the upstream bandwidth position.

Furthermore, the ONU is adapted to retrieve the corresponding bit quantity from the upstream timeslot indication overhead located in the highest few bit positions in the upstream bandwidth position, according to the bit quantity required for the upstream bandwidth position sent from the OLT.

An ONU includes: an interface unit, adapted to receive downstream frames from the OLT, and send upstream data from the upstream bandwidth position of the upstream frame to the OLT; and a transmission convergence unit, adapted to retrieve the upstream timeslot indication overheads in different downstream frames according to the multiframe indication, and determine an upstream bandwidth position specific to highest bits and lowest bits. More particularly, a transmission convergence unit is adapted to retrieve the upstream timeslot indication overhead from different downstream frames and determine an upstream bandwidth position jointly specific to highest bits and lowest bits, generate an upstream burst frame according to the upstream bandwidth position, where the upstream burst frame includes an upstream overhead area and a payload area, set a physical-layer time overhead, which includes at least setting of a preamble time and a frame delimiting time, and send an upstream burst frame to the interface unit. An interface unit includes an optical transmitter for transmitting burst data and an optical receiver for receiving downstream optical signals, and is adapted to enable the laser before sending burst data according to the set laser enable time overhead, and disable the laser after finishing burst data sending.

Further, the interface unit is adapted to send the bit quantity required for the upstream bandwidth position from the OLT to the transmission convergence unit; the transmission convergence unit is adapted to retrieve the corresponding bit quantity from the upstream timeslot indication overhead located in the highest few bit positions in the upstream bandwidth position, according to the bit quantity required for the upstream bandwidth position.

Figure 9:
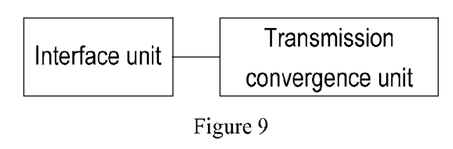
FIG. 9 shows the structure of a data transmission apparatus according to an embodiment of the present invention.

In the case that the apparatus shown in FIG. 9 is located in the OLT, the apparatus includes: a transmission convergence unit, adapted to make up a downstream frame structure, and set a multiframe indication and an upstream timeslot indication overhead in the downstream frame; and an interface unit, adapted to send downstream frames and receive data. Further, the transmission convergence unit is adapted to determine bit quantity required for the upstream bandwidth position; and the interface unit is adapted to send the bit quantity required for the upstream bandwidth position. Further still, the transmission convergence unit allocates to each ONU an upstream bandwidth position for sending upstream data according to the time length of the upstream frame, and then determines the upstream timeslot indication overhead included in each downstream frame in the downstream multiframe according to the upstream bandwidth position.

In the case that the apparatus shown in FIG. 9 is located in the ONU, the apparatus includes: an interface unit, adapted to receive downstream frames, and send upstream data from the upstream bandwidth position of the upstream frame; and a transmission convergence unit, adapted to determine the upstream bandwidth position according to the multiframe indication and the upstream timeslot indication overhead. Further, the interface unit is adapted to send the received bit quantity to the transmission convergence unit; the transmission convergence unit is adapted to retrieve the corresponding bit quantity from the upstream timeslot indication overhead located in the highest few bit positions in the upstream bandwidth position, according to the bit quantity required for the upstream bandwidth position. More particularly, a transmission convergence unit is adapted to retrieve the upstream timeslot indication overhead from different downstream frames and determine an upstream bandwidth position jointly specific to highest bits and lowest bits, generate an upstream burst frame according to the upstream bandwidth position, where the upstream burst frame includes an upstream overhead area and a payload area, set a physical-layer time overhead, which includes at least setting of a preamble time or a frame delimiting time, and send an upstream burst frame to the interface unit. An interface unit includes an optical transmitter for transmitting burst data and an optical receiver for receiving downstream optical signals, and is adapted to enable the laser before sending burst data according to the set laser enable time overhead, and disable the laser after finishing burst data sending.

An ONU can work in either of the following modes, in which, if the time length of an upstream frame is L times as much as that of an existing upstream frame, it means that the time length of an upstream frame is L times as much as that of a downstream frame, with L being either an integer or non-integer. Mode 1: In the case that the ONU transmits a data quantity which is same as the existing data quantity, the T-CONT transmitted by the ONU in an upstream frame is L times that of the existing T-CONT, but the total overhead area is only 1/L of that under the prior art. Namely, with the ONU upstream bandwidth being constant, the T-CONT is in proportion to the time length of the upstream frame. This saves overhead areas and improves the bandwidth utilization. Method 2: without improving the bandwidth utilization, the saved time is used to extend the physical-layer time overhead to up to L times. Namely, with the upstream bandwidth efficiency of the ONU being constant, the time overhead length for the ONU to handle upstream data is in proportion to the upstream frame length, thus reducing the requirement on the ONU burst enable time and the disable time, reducing the production cost of the transmitting unit (interface unit) that transmits upstream burst packets, and enhancing the reliability of the OLT in receiving upstream burst packets. The working mode of the ONU is notified by the Network Management System (NMS) through the OLT.

Although the invention has been described through some exemplary embodiments, the invention is not limited to such embodiments. It is apparent that those skilled in the art can make various modifications and variations to the present invention without departing from the spirit and scope of the present invention. The present invention is intended to cover these modifications and variations provided that they fall in the scope of protection defined by the following claims or their equivalents.

What is claimed is:

1. A method for transmitting data, comprising:
    allocating an upstream bandwidth position to an Optical Network Unit (ONU), according to time length of an upstream frame;
    setting an upstream timeslot indication overhead into a downstream frame according to the upstream bandwidth position and a multiframe indication;
    setting the multiframe indication and the upstream timeslot indication overhead in the downstream frame; and
    sending the downstream frame to the ONU;
    wherein the multiframe indication is a multiframe count bit, and the multiframe count bit is part of bits in a superframe counter in a downstream physical-layer control block.

2. The method of claim 1, wherein, the method further comprises: through a PLOAMd message, notifying the ONU to receive the downstream frame in a multiframe mode.

3. The method of claim 1, wherein the method further comprises: notifying bit quantity required by the upstream bandwidth position to the ONU.

4. A method for transmitting data, comprising:
    allocating an upstream bandwidth position to an Optical Network Unit (ONU), according to time length of an upstream frame;
    setting all upstream timeslot indication overhead into a downstream frame according to the upstream bandwidth position and a multiframe indication;
    setting the multiframe indication and the upstream timeslot indication overhead in the downstream frame; and
    sending the downstream frame to the ONU;
    wherein the multiframe indication is a multiframe count bit, and the multiframe count bit is a multiframe counter bit that is set separately from a superframe counter.

* * * * *